US012147725B1

(12) United States Patent
Liu et al.

(10) Patent No.: US 12,147,725 B1
(45) Date of Patent: Nov. 19, 2024

(54) SYSTEMS AND METHODS FOR PROVIDING AUGMENTED INTERACTIVE BROWSING PLATFORM

(71) Applicant: HYTTO PTE. LTD., Singapore (SG)

(72) Inventors: Dan Liu, Guangzhou (CN); Jilin Qiu, Guangzhou (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/400,835

(22) Filed: Dec. 29, 2023

(51) Int. Cl.
  *G06F 3/14* (2006.01)
  *A61H 19/00* (2006.01)
  *H04L 67/306* (2022.01)

(52) U.S. Cl.
  CPC ............ *G06F 3/1423* (2013.01); *A61H 19/30* (2013.01); *H04L 67/306* (2013.01)

(58) Field of Classification Search
  CPC ...... G06F 3/1423; H04L 67/306; A61H 19/30
  See application file for complete search history.

(56) References Cited

U.S. PATENT DOCUMENTS 8,510,381 B1 *  8/2013  Birand .................... G06Q 10/10
                                                            709/204
8,813,125 B2    8/2014  Reisman
2012/0011540 A1 *  1/2012  Pulford .............. G06Q 30/0261
                                                            715/753
2013/0067526 A1    3/2013  Reisman
2018/0121440 A1 *  5/2018  Maquaire ............ G06F 16/2365

OTHER PUBLICATIONS

Gerald C. Kane, Maryam Alavi, Giuseppe (Joe) Labianca and Stephen P. Borgatti, What's Different About Social Media Networks? a Framework and Research Agenda, MIS Quarterly, vol. 38 No., Mar. 1, 2014.

* cited by examiner

*Primary Examiner* — Muhammad N Edun
(74) *Attorney, Agent, or Firm* — Evergreen Valley Law Group; Kanika Radhakrishnan

(57) ABSTRACT

The present invention relates to methods and systems for an augmented interactive browsing platform for allowing users to share content among each other. The method performed by an application server includes receiving a request from a user device of a user of a plurality of users for accessing a plurality of virtual screens of an interactive browsing platform. The method includes rendering the plurality of virtual screens on the user device in response to receipt of the request from the user. Each of the plurality of virtual screens includes at least one or more shared content fed by one or more sources. The method further includes executing one or more control inputs provided by the user using at least one virtual element of the user. Further corresponding actions are performed in the interactive browsing platform rendering the one or more shared content in the plurality of virtual screens.

20 Claims, 8 Drawing Sheets

SYSTEMS AND METHODS FOR PROVIDING AUGMENTED INTERACTIVE BROWSING PLATFORM

TECHNICAL FIELD

The present disclosure relates to information processing techniques and more particularly relates to systems and methods for providing an augmented interactive browsing platform for allowing users to share content with each other.

BACKGROUND

The Internet provides access to a content-rich network to each individual or person. In particular, any person can instantly obtain content from nearly any source in the world. However, the content-based experience provided on the internet is relatively an individual's choice i.e., each person may at least access the content or perform content-related operations. Further, in recent times, people rely on one or more technological solutions as an alternative to face-to-face communications for content sharing. One such example is sharing the content with others using traditional communication protocols such as via electronic mail (e-mail) or any other means. However, content sharing using traditional communication protocols may not be engaging as each individual may have different interests. Hence, socializing with the content using traditional communication protocols remains unsatisfactory.

In addition, there are many tools or methods for identifying interest-centric content or other individuals with similar interests. However, the existing tools involve sophisticated methods that require the users to affirmatively contact other individuals or access shared content. Moreover, the existing tools or methods for interaction on any network are limited in their capabilities concerning sharing content and real-time interaction between users.

Therefore, there exists a need to develop an improved system and method for providing an interactive browsing platform, that overcomes the aforementioned deficiencies along with providing other advantages.

SUMMARY

Various embodiments of the present disclosure disclose methods and systems for providing an augmented interactive browsing platform for allowing users to share content with each other.

In an embodiment, a computer-implemented method is disclosed. The computer-implemented method performed by an application server includes receiving a request from a user device associated with a user of a plurality of users for accessing a plurality of virtual screens of an interactive browsing platform. The method includes rendering the plurality of virtual screens on the user device of the user in response to receipt of the request from the user. Each of the plurality of virtual screens includes at least one or more shared content fed by one or more sources. The method further includes executing one or more control inputs provided by the user using at least one virtual element associated with the user. Further corresponding actions are performed in the interactive browsing platform rendering the one or more shared content in the plurality of virtual screens in response to executing the one or more control inputs provided using the at least one virtual element of the user.

In another embodiment, an application server is disclosed. The application server includes a communication interface, a memory configured to store instructions, and a processor. The processor is configured to execute the instructions stored in the memory and thereby cause the application server to at least receive a request from a user device associated with a user of a plurality of users for accessing a plurality of virtual screens of an interactive browsing platform. The application server is caused to render the plurality of virtual screens on the user device of the user in response to receipt of the request from the user. Each of the plurality of virtual screens includes at least one or more shared content fed by one or more sources. The application server is further caused to execute one or more control inputs provided by the user using at least one virtual element associated with the user. Further corresponding actions are performed in the interactive browsing platform rendering the one or more shared content in the plurality of virtual screens in response to executing the one or more control inputs provided using the at least one virtual element of the user.

In another embodiment, a non-transitory computer-readable storage medium is disclosed. The non-transitory computer-readable storage medium includes computer-executable instructions that, when executed by at least a processor of an application server, cause the application server to perform a method includes receiving a request from a user device associated with a user of a plurality of users for accessing a plurality of virtual screens of an interactive browsing platform. The method includes rendering the plurality of virtual screens on the user device of the user in response to receipt of the request from the user. Further, each virtual screen of the plurality of virtual screens comprises at least one or more shared content fed by one or more sources. The method further includes executing one or more control inputs provided by the user using at least one virtual element associated with the user. Further, corresponding actions are performed in the interactive browsing platform rendering the one or more shared content in the plurality of virtual screens in response to executing the one or more control inputs provided using the at least one virtual element of the user.

BRIEF DESCRIPTION OF THE FIGURES

The following detailed description of illustrative embodiments is better understood when read in conjunction with the appended drawings. For the purposes of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features.

The term "the interactive browsing platform" used therein corresponds to a three-dimensional (3D) space.

The term "virtual element" used therein relates to a virtual avatar (third person perspective) and/or a virtual camera (first person perspective) in the 3D space.

Further, the term "virtual screen" used therein refers to a virtual flat screen, stereoscopic multi-surface screens (each surface configured to display different content), or 3D holographic projections (e.g., no screen but only the 3D image of the model).

Various embodiments of the present invention are described hereinafter with reference to FIG. 1 to FIG. 6.

Figure 1:
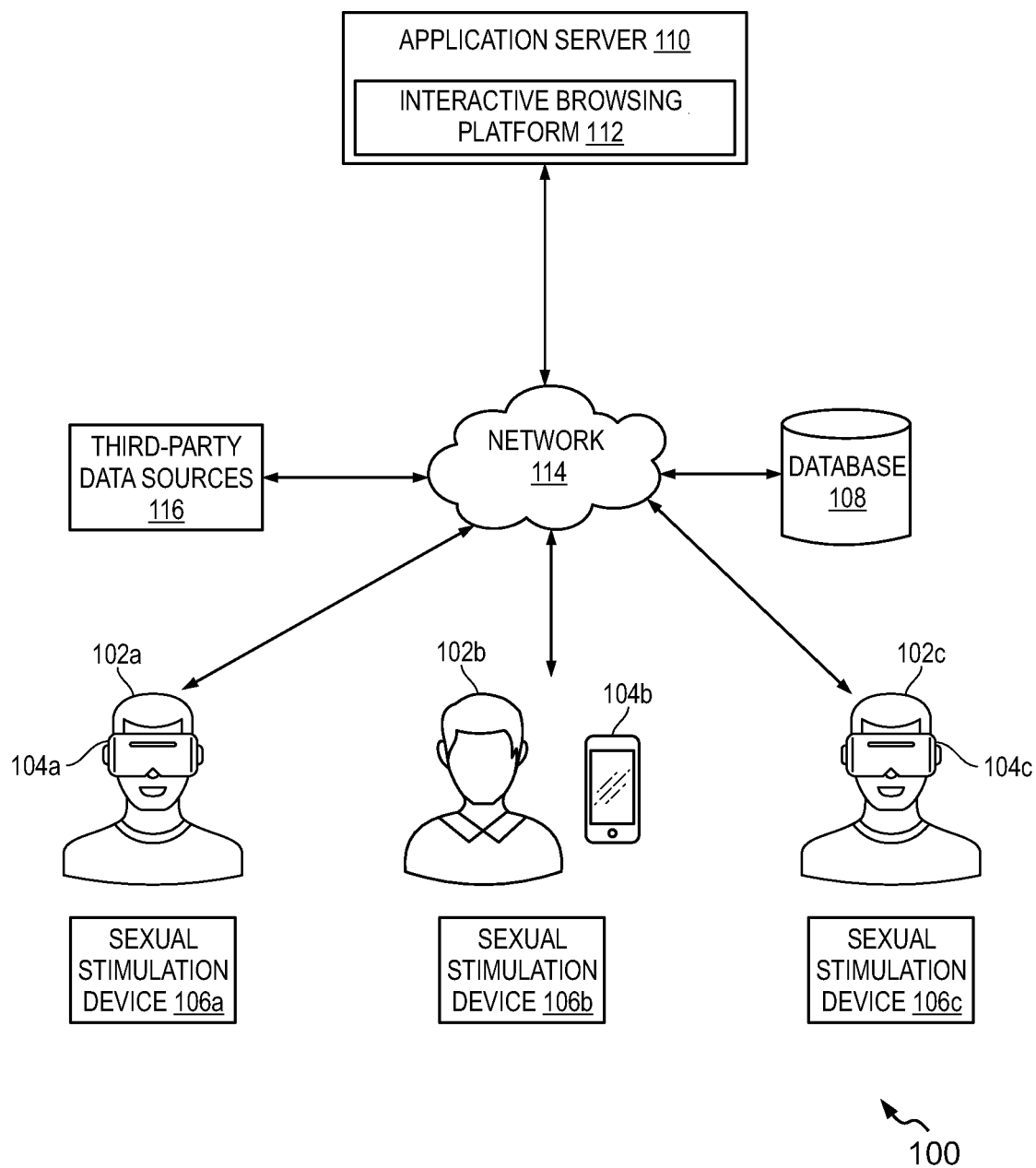
FIG. 1 illustrates an example representation of an environment related to at least some example embodiments of the present disclosure.

FIG. 1 illustrates an example representation of an environment 100 related to at least some example embodiments of the present disclosure. Although the environment 100 is presented in one arrangement, other arrangements are also possible where the parts of the environment 100 (or other parts) are arranged or interconnected differently. The environment 100 generally includes a plurality of users (collectively referring to a user 102a, a user 102b, and a user 102c). Each of the users 102a, 102b, and 102c is associated with a user device 104a, a user device 104b, and a user device 104c. The user devices 104a-104c may include at least a laptop computer, a phablet computer, a handheld personal computer, a virtual reality (VR) device, a netbook, a Web book, a tablet computing device, a Smartphone, or other mobile computing devices.

Further, each of the users 102a, 102b, and 102c is associated with a sexual stimulation device 106a, a sexual stimulation device 106b, and a sexual stimulation device 106c, respectively. The sexual stimulation devices 106a-106c may be selected based on the gender of the users 102a-102c. Some examples of the sexual stimulation devices may include, but not limited to, a dildo, a vibrator, a masturbator, and the like. The sexual stimulation devices 106a-106c may be connected to the user devices 104a-104c using short-range wireless communication protocols. Some examples of short-range wireless communication protocols may be but are not limited to, near-field communication (NFC), wireless fidelity (Wi-Fi), Bluetooth, and the like.

Various entities in the environment 100 may connect to a network 114 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. In some instances, the network 114 may include a secure protocol (e.g., Hypertext Transfer Protocol (HTTP)), and/or any other protocol, or set of protocols. In an example embodiment, the network 114 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof.

The environment 100 further includes an application server 110. The application server 110 is configured to host and manage an interactive browsing platform 112. The application server 110 may be embodied in at least one computing device in communication with the network 114. The application server 110 may be specifically configured, via executable instructions to perform one or more of the operations described herein. In general, the application server 110 provides a web browsing experience that allows a user (e.g., the user 102a) to be engaged with an open-world scenario that is arranged with a plurality of virtual screens. Each virtual screen may display a web page being viewed and/or shared by other users (e.g., the users 102b and 102c).

The interactive browsing platform 112 is a set of computer-executable codes configured to allow the users 102a-102c to experience the web browsing experience in an open-world scenario. In one embodiment, the interactive browsing platform 112 may be accessed as a web-based application on the user devices 104a-104c. In another embodiment, the user devices 104a-104c may access an instance of the interactive browsing platform 112 from the application server 110 for installing on the user devices 104a-104c using application stores associated with operating systems such as Apple iOS®, Android™ OS, Google Chrome OS, Symbian OS®, Windows Mobile® OS, and the like.

In the illustrated embodiment, a user (e.g., the user 102*a*) may access the interactive browsing platform 112 to experience the web browsing in the open world (or the virtual world). The interactive browsing platform 112 renders a plurality of virtual screens to the user 102*a*. Each virtual screen of the plurality of virtual screens may include one or more shared content fed by one or more sources. The one or more sources may include, but not limited to the shared content from the plurality of users 102*a*-102*c* and third-party data sources 116 (e.g., social media websites, a video sharing platform, adult websites, etc.). The shared content may include, but not limited to, webpages, image files, video files, and live streams. In particular, the application server 110 receives the one or more shared content from the plurality of users 102*a*-102*c* via one or more file sharing techniques. The sharing techniques may include directly uploading the shared content in the interactive browsing platform 112, uniform resource locator (URL) of the live streams, search results pertaining to a video file on a search engine and scanning a quick response (QR) code for transmitting the shared content. Upon receipt of the shared content, the applications server 110 renders the virtual screens based on implementing content rendering techniques. In other words, the application server 110 creates the virtual screens by including the one or more shared content in each of the virtual screens based on implementing the content rendering techniques. The content rendering techniques correspond to virtual reality (VR) rendering techniques. Further, the shared content, the virtual screens, etc., is shared in a database 108 associated with the application server 110. For description purposes, the present disclosure is explained with reference to the user 102*a*. Further, similar operations can be performed by the users 102*b* and 102*c*, without limiting the present disclosure.

The user 102*a* accesses the interactive browsing platform 112 by transmitting a request from the user device 104*a* (e.g., a virtual reality (VR) device). Alternatively, the user 102*a* may include a smartphone or a laptop that is communicably coupled to the user device 104. In response to the receipt of the request from the user 102*a*, the application server 110 renders the virtual screens on the user device 104*a* of the user 102*a*. As explained above, each virtual screen includes one or more shared content. The one or more shared content may be real-time content or stored content. Further, the virtual screens in the interactive browsing platform 112 can be mobile or fixed, zoom in and out, change any shape and style, or appear as a non-physical entity.

The application server 110 executes one or more control inputs provided by the user 102*a* using at least one virtual element associated with the user 102*a*. It is to be noted that, corresponding actions are performed in the interactive browsing platform 112 rendering the shared content in the virtual screens in response to executing the control inputs provided using the virtual element associated with the user 102*a*. This corresponds to a mode of information sharing in a virtual world with a high degree of freedom and the ability to interact as in real life. For example, the user 102*a* may provide the control inputs using the virtual element for performing the actions such as, but not limited to, navigating in the virtual screen, teleportation, special effects, selection of the virtual screen, moving a visual representation (or avatar of the users 102*a* among multiple virtual screens in the interactive browsing platform 112, and the like. It should be understood that the avatar of the user 102*a* may navigate in the interactive browsing platform 112 irrespective of the shared content being rendered in the virtual screens. In this scenario, the relative position or angle between the virtual screen and the avatar is rendered in the interactive browsing platform 112 to the user 102*a*.

In addition, the application server 110 displays a visual representation of the virtual element along with a profile information of the user proximate to the visual representation of the virtual element in the virtual screen among the plurality of virtual screens being viewed by the user 102*a*. Further, displaying the visual representation of the virtual element and the profile information of the user 102*a* allows other users (e.g., the users 102*b* and 102*c*) of the interactive browsing platform 112 to access data related to the visual representation of the virtual element and the profile information of the user 102*a* when the other users 102*b* and 102*c* view the virtual screen that is being viewed by the user 102*a*. For example, the user 102*a* may be viewing a virtual screen 'A' in which the visual representation of the virtual element and the profile information of the user 102*a* are displayed. Further, the users 102*b* and 102*c* may access the virtual screen 'A' on their respective user devices 102*b* and 102*c*. In this scenario, the users 102*b* and 102*c* can view the visual representation of the virtual element and the profile information of the user 102*a* in the virtual screen 'A', and vice versa. The profile information may include, but not limited to, a username, chat messages, local weather, current mood, and geographical distance. The user 102*a* and the other users 102*b* and 102*c* may be different network users, or different devices or browsers that are from the same network.

In some embodiments, the user 102*a* may use the interactive browsing platform 112 in an incognito mode to prevent the other users 102*b* and 102*c* to view the information of the user 102*a*. In particular, the user 102*a* may provide an input related to selection of a stealth function from the user 102*a*. Thereafter, the application server 110 activates the stealth function in the interactive browsing platform 112 for the user 102*a*. The stealth function restricts access to at least the shared content of the virtual screen being viewed by the user, the profile information of the user, and the visual representation of the user for the other users 102*b* and 102*c* when the other users 102*b* and 102*c* view the virtual screen being viewed by the user 102*a*. For example, the user 102*a* viewing the virtual screen 'A' may select the stealth function. In this scenario, the application server 110 activates the stealth function for the user 102*a* which restricts the other users 102*b* and 102*c* from viewing the virtual screen 'A' to access the shared content of the virtual screen being viewed by the user, the profile information of the user and the visual representation. Further, the user 102*a* may view a visual representation of at least one virtual element, profile information, or shared content viewed by the other users 102*b* and 102*c* in the interactive browsing platform 112. It is to be noted that the visual representation of the virtual element, the profile information, and the shared content are accessed by the user 102*a* in case the other users 102*b* and 102*c* have not opted for the stealth function. Thus, upon activating the stealth function, the user 102*a* may browse or view the content in the virtual screen 'A' and spy on the other users 102*b* and 102*c* of the virtual screen 'A'.

In one embodiment, the user 102*a* may interact with the visual representation of the virtual element of the other users 102*b* and 102*c* when the users 102*a*-102*c* are viewing the same virtual screen. The user 102*a* may transmit a first interaction instruction from the user device 104*a* while viewing the shared content in the virtual screen rendered in the interactive browsing platform 112. Thereafter, the application server 110 controls the visual representation of the virtual element of the user 102*a* to interact with the visual representation of the virtual element of the other users 102b and 102c accessing the virtual screen being viewed by the user 102a. The first interaction instruction may be related to activities such as chat conversation, physical interactions, and the selection of virtual properties associated with the interactive browsing platform 112.

Further, the user 102a may interact with the one or more shared content of the virtual screens being rendered in the interactive browsing platform 112. More specifically, the user 102a may transmit a second interaction instruction to the application server 110 for interacting with the one or more shared content on the virtual screen. In this scenario, the application server 110 controls the visual representation of the virtual element of the user 102a to interact with the shared content of the virtual screen. The application server 110 offers a first set of interaction features in the interactive browsing platform 112 in response to the second interaction instruction. The first set of interaction features may include, but not limited to, throwing objects (e.g., flowers, coins, tokens, eggs, etc.,) on the shared content, providing reward points (holding monetary value) to a creator of the shared content, and editorial options for editing the shared content, etc.

In an embodiment, the user 102a may provide an input data for accessing the one or more shared content in the virtual screens rendered in the interactive browsing platform 112. The input data corresponds to a number of tokens being provided by the user 102a in the interactive browsing platform 112. In one scenario, the user 102a may provide the tokens while entering the interactive browsing platform 112. The tokens may be preset in the interactive browsing platform 112 to allow the user 102a to utilize the features of the interactive browsing platform 112. In response to receipt of the tokens, the application server 110 may render at least one visual effect in the interactive browsing platform 112 to the user 102a while the user 102a accesses the interactive browsing platform 112. In other words, the user 102a provides the input data and enters the interactive browsing platform 112. In this scenario, the user 102a is provided with the visual effects to create the effect of welcoming the user 102a to the interactive browsing platform 112. The visual effects may include at least a halo effect, Background Music (BGM), system beeps, or any other visual effect. Further, the visual effects may render the virtual screen towards the user 102a to create the effect of welcoming the user 102a.

Further, the user 102a may customize the visual representation of the virtual element of the other users 102b and 102c of the interactive browsing platform 112. More specifically, the user 102a may transmit a third interaction instruction to the application server 110 for customizing the visual representation of the virtual element associated with at least the user 102a and the other users 102b and 102c of the virtual screen. It is to be noted that the third interaction instruction for customizing the virtual element of the other users 102b and 102c is transmitted by the user 102a upon providing the input data in the interactive browsing platform. In other words, the user 102a is allowed to send the third interaction instruction upon providing the input data (tokens) in the interactive browsing platform 112.

The application server 110 offers a second set of interaction features for customizing the visual representation of the virtual element of the user 102a and the other users 102b and 102c of the virtual screen. The second set of interaction features may include the acquisition of virtual properties (ropes, candles, whips, erotic uniforms, and so on) in the interactive browsing platform 112. In one case, the user 102a customizes the visual representation of the virtual element of the user 102a. In this scenario, the user 102a can customize the visual representation of the virtual element of the user 102a by utilizing the second set of interaction features of the interactive browsing platform 112. In another case, the user 102a sends the third interaction instruction to customize the visual representation of the other users 102b and 102c. In this scenario, the applications server 110 transmits an invite to the other users 102b and 102c of the interactive browsing platform 112. Thereafter, the visual representation of the virtual element of the other users 102b and 102c is customized upon acceptance of the invite by the other users 102b and 102c.

Further, the application server 110 may dynamically adjust at least one attribute of the one or more shared content in the virtual screen. More specifically, the application server 110 may monitor at least one virtual screen parameter of the virtual screen in real time. The virtual screen parameters may include, but are not limited to, a number of users of the virtual screen, and the input data received from each of the plurality of users 102a-102c for the shared content displayed in the virtual screen. The input data from the users 102a-102c corresponds to the overall input data (or overall number of tokens). Further, the attributes may include a position and dimension of the virtual screen. Thus, the application server 110 adjusts the position and dimensions (or size) of the shared content in the virtual screen based on real-time monitoring of the virtual screen parameters. In an example scenario, the user 102a may provide the tokens and enter the interactive browsing platform 112. The number of tokens may exceed a present number of tokens defined in the interactive browsing platform 112. For example, the user 102a may provide 20 tokens and the preset number of tokens may be 15 tokens. In this scenario, the virtual screens may be automatically turned or leaned towards the user 102a while the user 102a navigates through the multiple virtual screens in the interactive browsing platform 112. This may increase the chances of the user 102a providing a greater number of tokens in the interactive browsing platform 112. In another example scenario, the interactive browsing platform 112 may depict a ranking section to render components of the interactive browsing platform 112 for example, the virtual screen parameters. Additionally, the position and the dimension of the virtual screen may be adjusted corresponding to the virtual screen parameters (e.g., the number of users (or visitors) of the virtual screen, the number of tokens, or the number of tokens accumulated at the creator of the virtual screen.

In an embodiment, the application server 110 monitors the actions performed in the interactive browsing platform 112 rendering the one or more shared content in the plurality of virtual screens to the user 102a. Further, the application server 110 may control the sexual stimulation device 106a of the user 102a corresponding to the actions performed in the interactive browsing platform 112. The actions may include adjusting a position and/or a perspective of the visual representation of the virtual element of the user 102a in the virtual screen. In other words, the actions may include the visual representation of the virtual element of the user 102a being closer or away from the virtual screen and its orientation in the virtual screen, etc. Upon determining the actions, the application server 110 may generate a control instruction corresponding to the actions performed in the interactive browsing platform 112. Thereafter, the application server 110 transmits the control instruction to the user 102a for operating the sexual stimulation device 106a of the user 102a. The control instruction is configured to operate the sexual stimulation device 106a for providing sexual stimulation to the user corresponding to the actions performed in the interactive browsing platform 112. For example, in the interactive browsing platform 112, the visual representation of the virtual object is approaching the virtual screen that is broadcasting a live adult stream. Further, as the virtual object controlled by the user 102a approaches closer to the virtual screen, the operating intensity (e.g., may be set high) of the sexual stimulation device 106a is adjusted.

The application server 110 is further configured to determine a category of the one or more shared content of the plurality of virtual screens to be rendered to the user 102a based at least on one or more conditions defined in the interactive browsing platform 112. The category of the shared content may be grouped/divided into at least a minor category and an adult category. Further, the conditions may include, but not limited to, age factor, format of the shared content rendered in the virtual screens, and a rating of the shared content. The age factor corresponds to minor or adult. The format of the shared content may refer to an image format or a video format. Further, the rating of the shared content may refer to A-rated, U-rated, or R-rated zones. The rating of the shared content refers to viewing restrictions or an age limit for viewing specific content. Thus, it is to be understood that the application server 110 determines the category of the shared content to be rendered to the user 102a based on authenticating the age factor of the user 102a. In case the user 102a is determined to be a minor, the application server 110 renders the content for the minor category and/or restricts the user 102a from accessing the shared content of the adult category (e.g., the shared content of A-rated, U-rated, or R-rated zones). In case the user 102a is determined to be an adult, the application server 110 allows access to all the virtual screens including the shared content specific to the minor as well as adult category.

In some instances, the user 102a being the minor category may scroll through the shared content of the adult category (e.g., engage in a sexual game) while scrolling between multiple virtual screens in the interactive browsing platform 112. As explained above, the application server 110 continuously monitors the actions of the user 102a in the interactive browsing platform 112. The application server 110 facilitates dynamic teleportation of the virtual representation of the virtual element of the user 102a rendered in a virtual space (e.g., the virtual screen displaying the shared content of the adult category) to another virtual space of the plurality of virtual screens based on real-time identification of the conditions in the interactive browsing platform 112. For example, the virtual element of the user 102a may be directed towards the virtual screen rendering the shared content of the adult category). In this scenario, the visual representation of the virtual element of the user 102a is teleported to another virtual screen based on identifying the age factor of the user 102a pertaining to the minor category. Further, the category for the other virtual screen is determined based on the conditions. In particular, the category of the other virtual screen pertains to the shared content of the minor category. Thus, the virtual representation of the virtual element of the user 102a is dynamically teleported to the other virtual screen including the shared content of the minor category from the virtual screen including the shared content of the adult category.

In some embodiments, the visual representation of the virtual element of the user (e.g., the user 102a) may automatically trigger tasks in the interactive browsing platform 112. The tasks may include, but not limited to, an orgasm within the day, or to interact with the sexual stimulation device of the multiple users within an hour. Further, the application server 110 may allow the user 102a to provide additional input data based on completing the tasks.

In at least one embodiment, the interactive browsing platform 112 may include a bot implementing artificial intelligence (AI). The bot may include a set of instructions configured to automatically trigger responses to the users 102a-102c of the interactive browsing platform 112.

Figure 2:
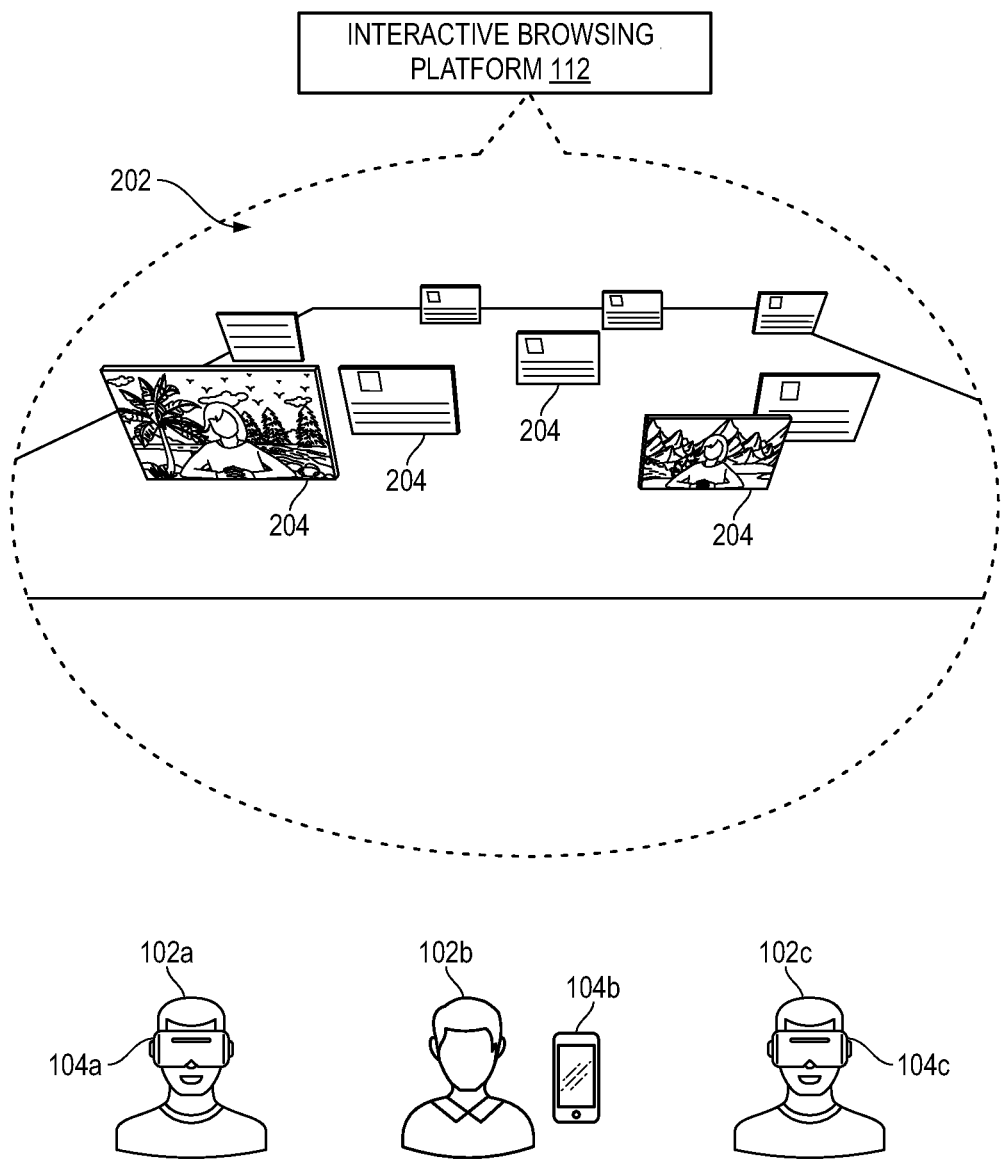
FIG. 2 illustrates an example scenario of an interactive browsing platform including a plurality of virtual screens to be rendered to a plurality of users of the interactive browsing platform, in accordance with an embodiment of the present disclosure.

Referring to FIG. 2, an example scenario depicting the interactive browsing platform 112 is illustrated. The interactive browsing platform 112 allows the users 102a-102c to experience web browsing in a simulated environment. The interactive browsing platform 112 includes a plurality of virtual screens (see, 202). Each of the virtual screens 202 displays one or more shared content (see, 204). As explained above, the shared content may include webpages, image files, video files, and live streams. Further, each of the users 102a-102c accesses the interactive browsing platform 112 using their respective user devices 104a-104c. The virtual screens may be accessed by the users 102a-102c by sending the request from their respective user devices 104a-104c.

Further, each of the users 102a-102c is associated with at least one virtual element such as a virtual element 302a, a virtual element 302b, and a virtual element 302c. For illustration purposes, the visual representation of the virtual element 302a-302c is shown as a "a star icon" in FIG. 3A. The users 102a-102c may provide the control inputs using their corresponding virtual elements 302a-302c for interacting in the interactive browsing platform 112.

Figure 3A:
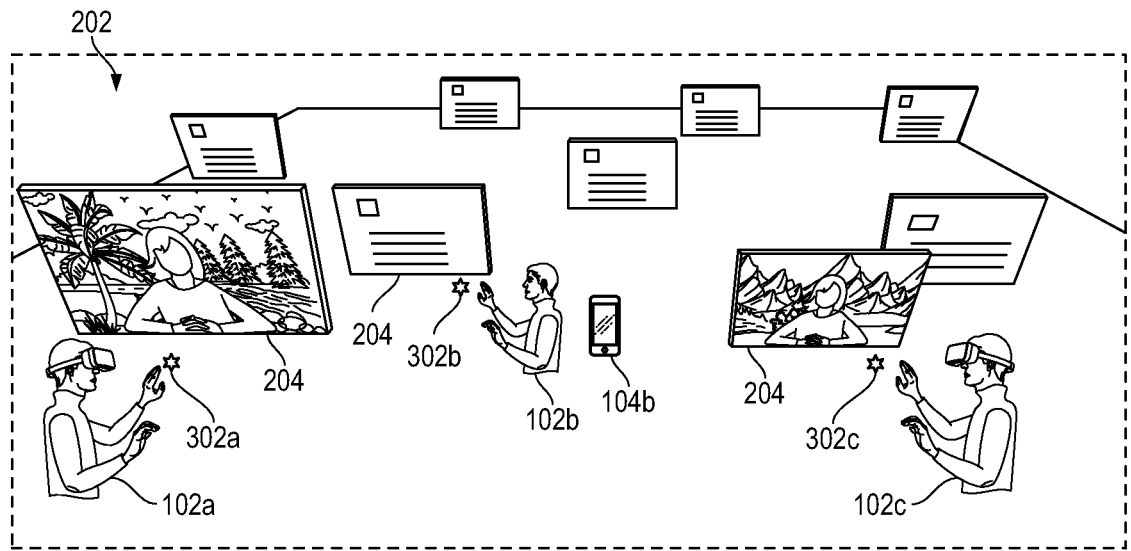
FIGS. 3A, 3B, 3C, 3D, and 3E illustrate example scenarios of the interactive browsing platform allowing the plurality of users to perform one or more operations in the interactive browsing platform, in accordance with an embodiment of the present disclosure.
Figure 3B:
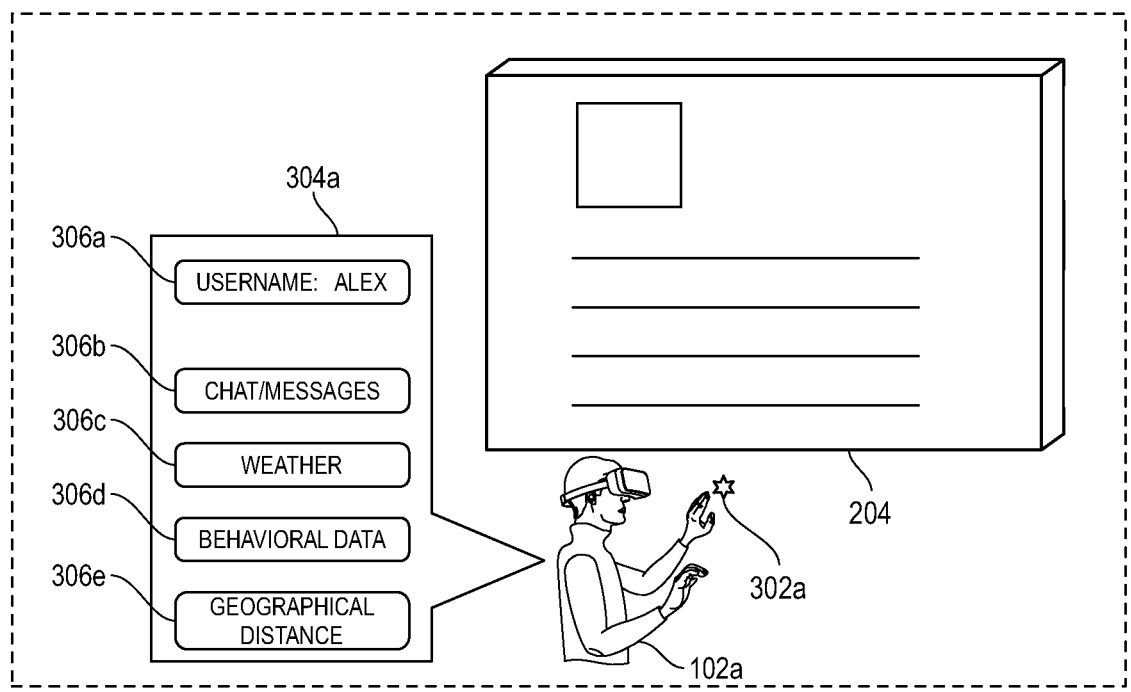

Referring to FIG. 3B, as explained above, the profile information of the users 102a-102c is displayed proximate to the visual representation of the virtual element of the users 102a-102c in the interactive browsing platform 112. As shown in FIG. 3B, a profile information (see, 304a) of the user 102a is displayed in the interactive browsing platform 112 in proximity to the visual representation of the virtual element 302a associated with the user 102a. The profile information 304a of the user 102a is exemplarily depicted to include a username 306a, a chat/message section 306b, a weather section 306c, behavioral data 306d, and a geographical distance 306e. Further, the profile information 304a of the user 102a rendered in the interactive browsing platform 112 may allow the other users (e.g., the users 102b and 102c) of the interactive browsing platform 112 to access data related to the visual representation of the virtual element 302a and the profile information 304a of the user 102a when the other users 102b and 102c view the virtual screen that is being viewed by the user 102a.

Figure 3C:
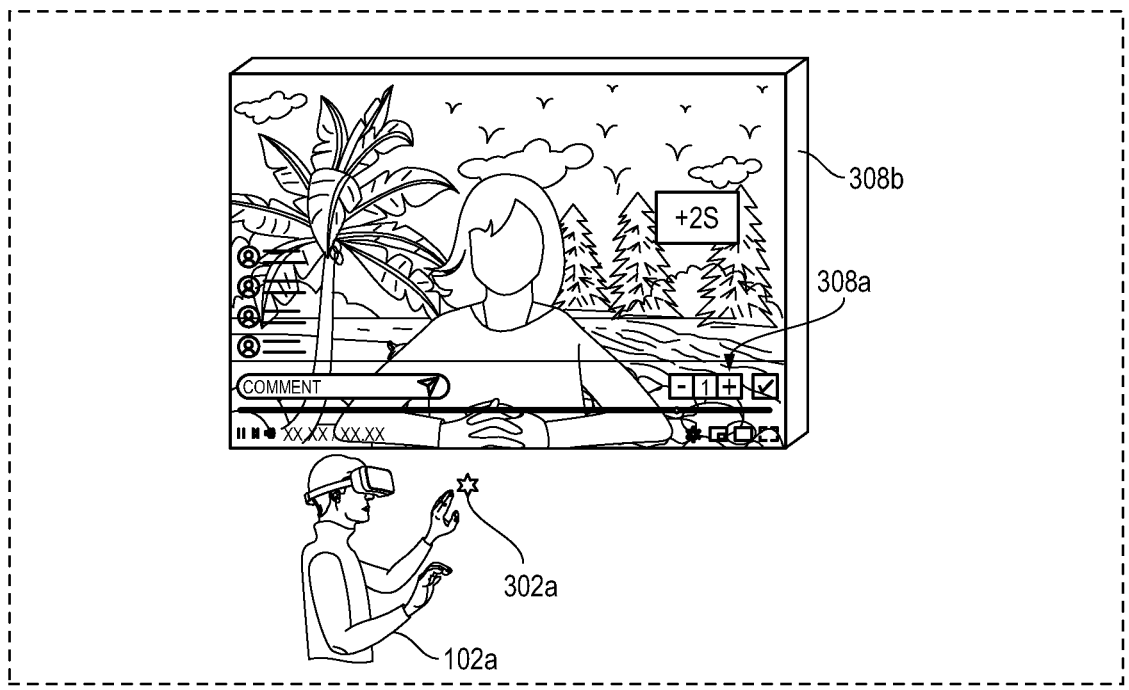

Referring to FIG. 3C, the user 102a may provide the second interaction instruction in the interactive browsing platform 112. To that effect, the user 102a is rendered with a first set of interaction features (see, 308a). This enables the user 102a to control the virtual element 302a to at least throw objects or tokens (i.e., reward points), etc., in a virtual screen (see, 308b) being viewed by the user 102a. The virtual screen 308b is exemplarily depicted to include a live broadcast. In this example scenario, the user 102a uses the virtual element 302a to provide tokens to the creator of the live broadcast. The number of tokens provided by the user 102a is exemplarily depicted as '+2S' in the live broadcast (or the virtual screen 308b).

Figure 3D:
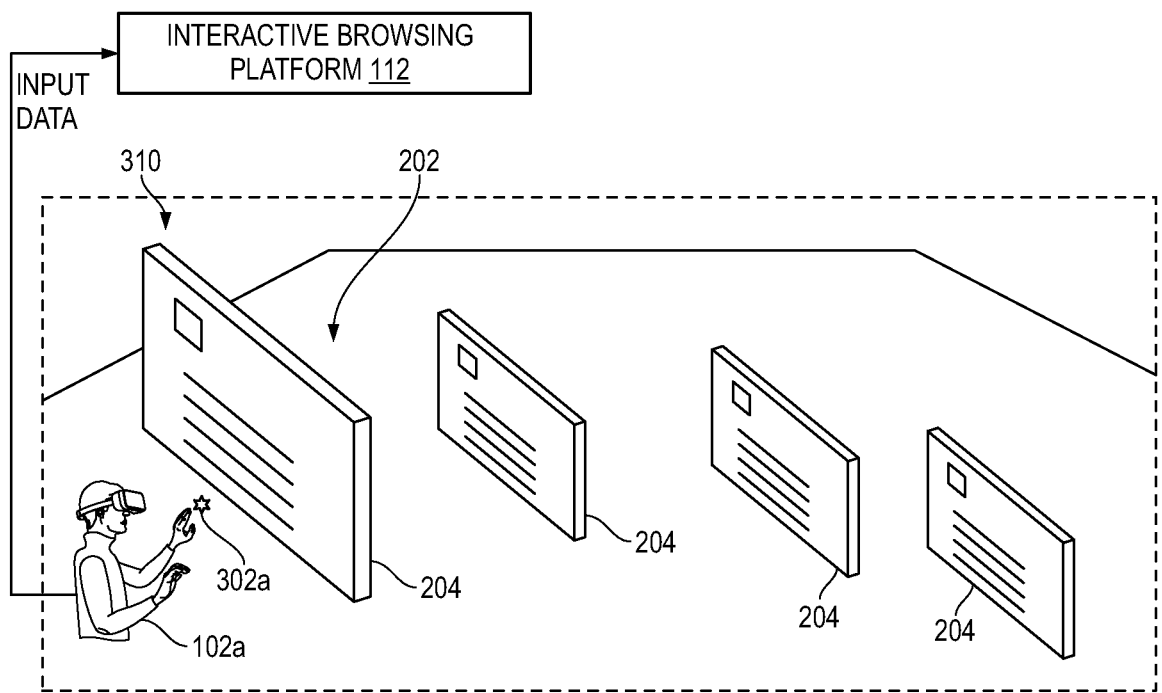

Referring to FIG. 3D, the user 102a may provide the input data for entering the interactive browsing platform 112 as explained above. The input data corresponds to the number of tokens being provided by the user 102a in the interactive browsing platform 112. In one scenario, the number of tokens provided by the user 102a exceeds the preset number of tokens defined for the interactive browsing platform 112.

In this scenario, the user 102*a* is rendered with at least one visual effect 310 in the interactive browsing platform 112. For example, the visual effect 310 may render the virtual screens 202 to be automatically directed (i.e., leaned or turned) towards the user 102*a* in the interactive browsing platform 112.

Figure 3E:
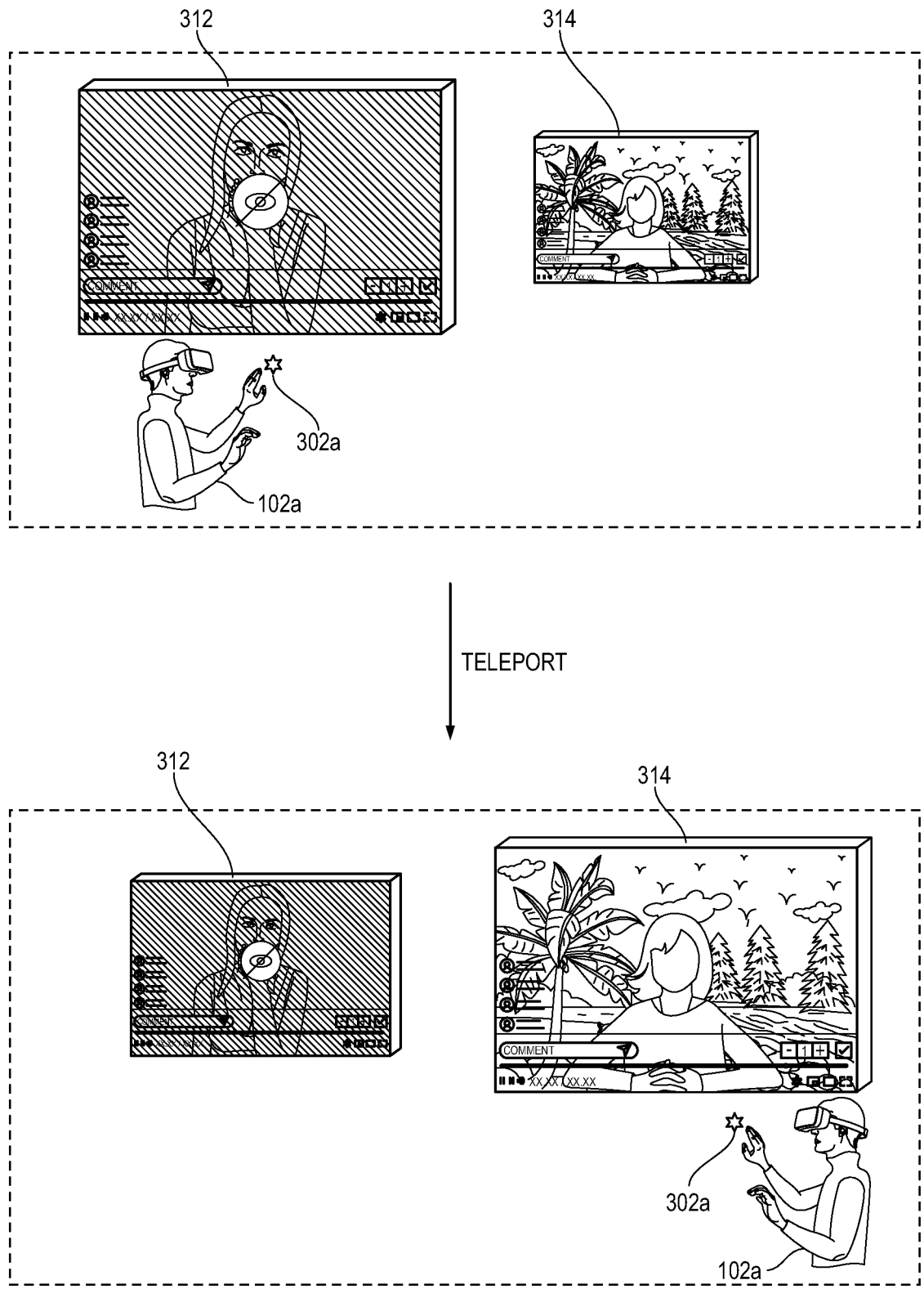

Referring to FIG. 3E, the virtual element 302*a* of the user 102*a* is dynamically teleported to another virtual screen of the virtual screens 202 based on real-time identification of the conditions in the interactive browsing platform 112. In one scenario, the virtual element 302*a* of the user 102*a* may be directed toward a virtual screen (see, 312) in the interactive browsing platform 112. The virtual screen 312 is exemplarily depicted to include the shared content related to the adult category. In this scenario, the virtual element 302*a* of the user 102*a* is teleported to another virtual screen (see, 314) in case the age factor of the user 102*a* is the minor category. It is to be noted that the category of the other virtual screen 314 corresponds to the minor category. Thus, the virtual representation of the virtual element of the user 102*a* is dynamically teleported to the other virtual screen including the shared content of the minor category from the virtual screen including the shared content of the adult category. Additionally, the virtual screen 312 rendering the adult category is masked (as shown in FIG. 3E) for the user 102*a* due to the age factor of the user 102*a*. Moreover, the dimensions of the virtual screens 312 and 314 are dynamically adjusted when the virtual element 302*a* of the user 102*a* is teleported from the virtual screen 312 to the virtual screen 314 in the interactive browsing platform 112. Further, the one or more operations of the interactive browsing platform 112 and the application server 110 are explained with reference to FIG. 1, therefore they are not reiterated herein for the sake of brevity.

Figure 4:
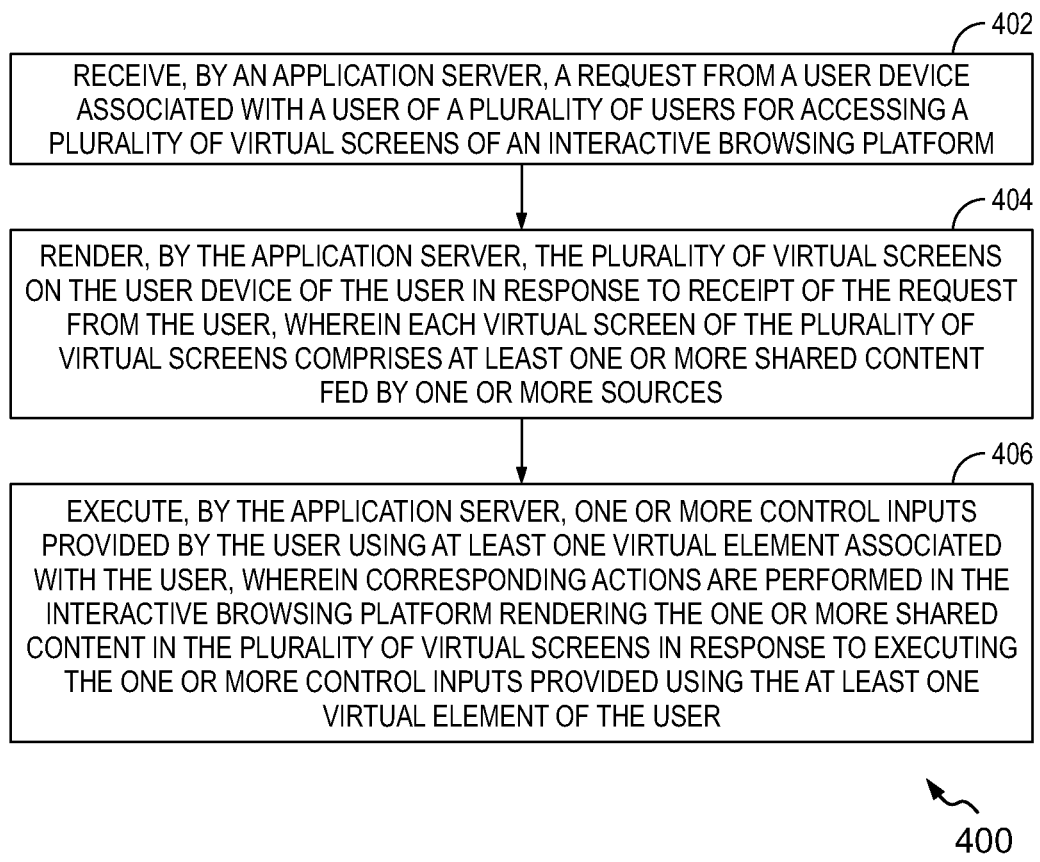
FIG. 4 illustrates a flow diagram of a computer-implemented method for providing an augmented interactive browsing platform for allowing the users to share content among each other, in accordance with an embodiment of the present disclosure.

FIG. 4 illustrates a flow diagram of a computer-implemented method 400 for providing an augmented interactive browsing platform for allowing the users 102*a*-102*c* to share content with each other, in accordance with an embodiment of the present disclosure. The method 400 depicted in the flow diagram may be executed by, for example, the application server 110. Operations of the flow diagram of the method 400, and combinations of the operations in the flow diagram of the method 400, may be implemented by, for example, hardware, firmware, a processor, circuitry, and/or a different device associated with the execution of software that includes one or more computer program instructions. It is noted that the operations of the method 400 can be described and/or practiced by using a system other than these server systems. The method 400 starts at operation 302.

At operation 402, the method 400 includes receiving, by the application server 100, a request from a user device associated with a user of a plurality of users for accessing a plurality of virtual screens of an interactive browsing platform.

At operation 404, the method 400 includes rendering, by the application server 110, the plurality of virtual screens on the user device of the user in response to receipt of the request from the user. Further, each virtual screen of the plurality of virtual screens includes at least one or more shared content fed by one or more sources.

At operation 406, the method 400 includes executing, by the application server 110, one or more control inputs provided by the user using at least one virtual element associated with the user. Further, corresponding actions are performed in the interactive browsing platform rendering the one or more shared content in the plurality of virtual screens in response to executing the one or more control inputs provided using the at least one virtual element of the user.

Figure 5:
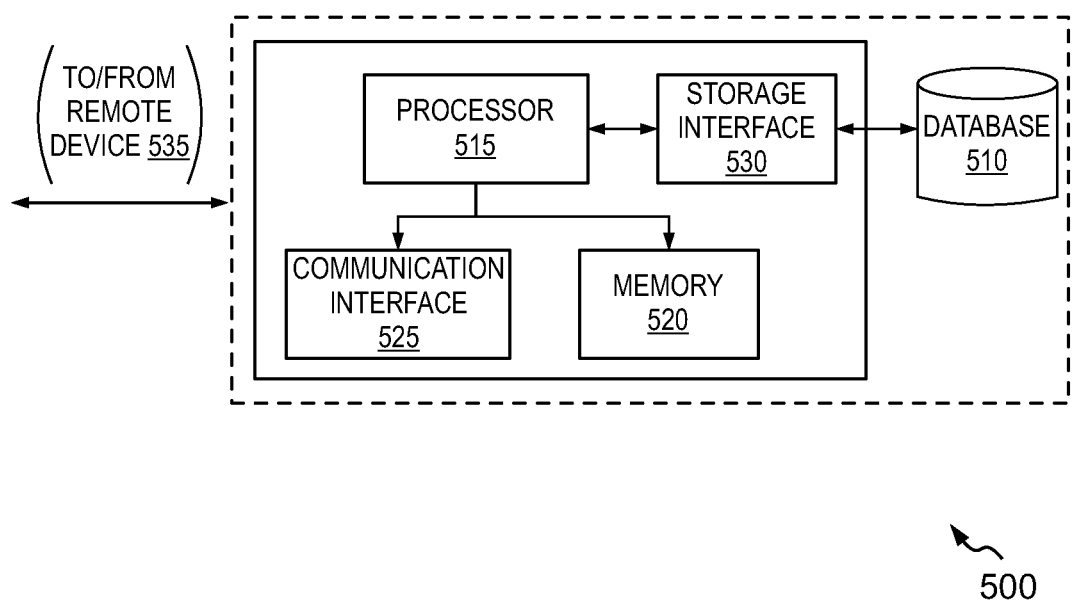
FIG. 5 is a simplified block diagram of an application server, in accordance with one embodiment of the present disclosure.

FIG. 5 is a simplified block diagram of an application server 500, in accordance with one embodiment of the present disclosure. The application server 500 is an example of the application server 110 of FIG. 1. The application server 500 may be a separate part, and may operate apart via the network 114 (as shown in FIG. 1). The application server 500 performs one or more operations as explained with references to FIG. 1 to FIG. 4. The application server 500 includes a computer system 505 and a database 510.

The computer system 505 includes at least one processor 515 for executing instructions. Instructions may be stored in, for example, but not limited to, a memory 520. The processor 515 may include one or more processing units (e.g., in a multi-core configuration). The processor 515 is operatively coupled to a communication interface 525 such that the computer system 505 is capable of communicating with a remote device 535 such as the user devices 104*a*-104*c*, or any other entity of FIG. 1. For example, the communication interface 525 may facilitate communication between the application server 500 and the remote device 535.

The processor 515 may also be operatively coupled to the database 510. The database 510 is any computer-operated hardware suitable for storing components of the interactive browsing platform 112. In some embodiments, the database 510 is integrated within the computer system 505. For example, the database 510 may include multiple storage units such as hard disks and/or solid-state disks in a redundant array of inexpensive disks (RAID) configuration. The database 510 may include a storage area network (SAN) and/or a network attached storage (NAS) system. In some embodiments, the database 510 is integrated into the computer system 505. For example, the computer system 505 may include one or more hard disk drives as the database 510. In other embodiments, the database 510 is external to the computer system 505 and may be accessed by the computer system 505 using a storage interface 530. The storage interface 530 is any component capable of providing the processor 515 with access to the database 510. The storage interface 530 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 515 with access to the database 510. The one or more operations performed by the application server 500 are already explained with references to FIGS. 1 to 4, and therefore they are not reiterated herein for the sake of brevity.

Figure 6:
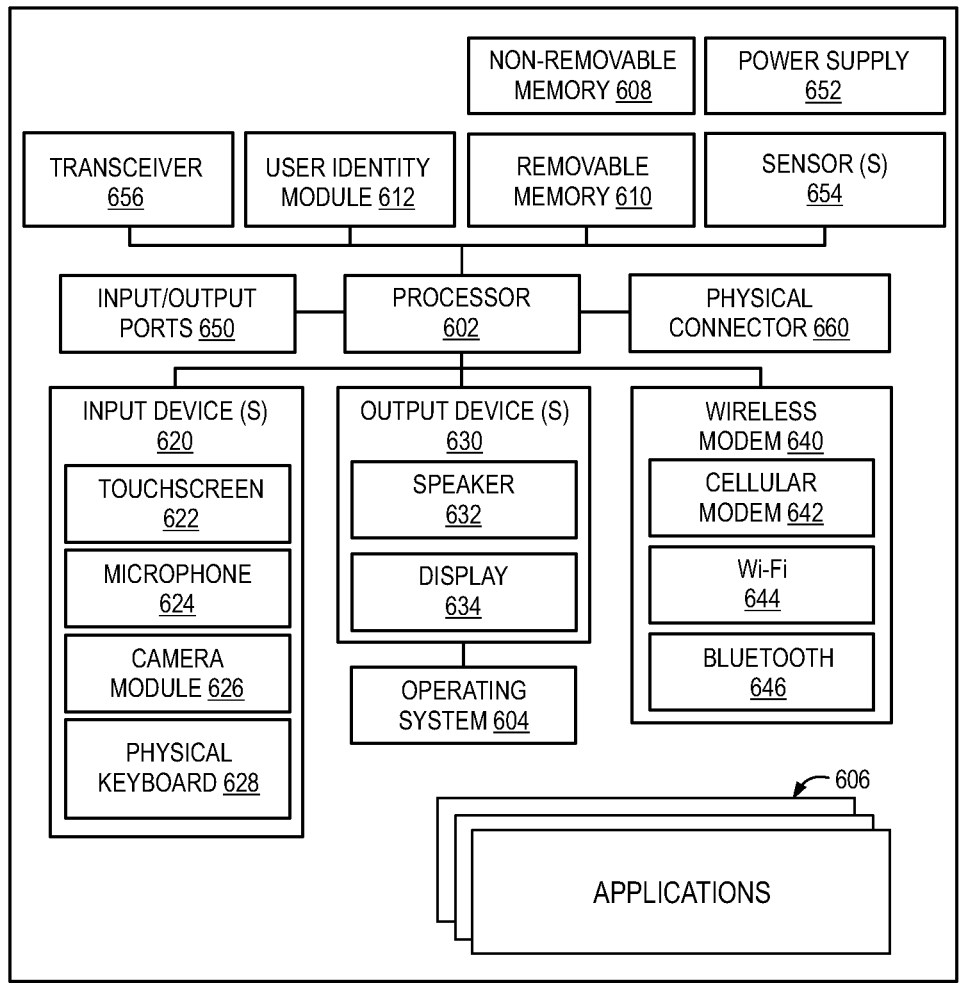
FIG. 6 is a simplified block diagram of an electronic device capable of implementing various embodiments of the present disclosure.

FIG. 6 is a simplified block diagram of an electronic device 600 capable of implementing various embodiments of the present disclosure. For example, the electronic device 600 may correspond to the user devices 104*a*-104*c* of FIG. 1. The electronic device 500 is depicted to include one or more applications 606. One of the one or more applications 606 installed on the electronic device 600 is capable of communicating with a server (i.e., the application server 110 or the application server 500) for performing one or more operations related to rendering simulated environments as explained above.

It should be understood that the electronic device 600 as illustrated and hereinafter described is merely illustrative of one type of device and should not be taken to limit the scope of the embodiments. As such, it should be appreciated that at least some of the components described below in connection with the electronic device 600 may be optional and thus in an embodiment may include more, fewer, or different components than those described in connection with the embodiment of the FIG. 6. As such, among other examples, the electronic device 600 could be any mobile electronic device, for example, cellular phones, tablet computers, laptops, mobile computers, personal digital assistants (PDAs), mobile televisions, MR headset device, mobile digital assistants, or any combination of the aforementioned, and other types of communication or multimedia devices.

The illustrated electronic device 600 includes a controller or a processor 602 (e.g., a signal processor, microprocessor, ASIC, or other control and processing logic circuitry) for performing such tasks as signal coding, data processing, image processing, input/output processing, power control, and/or other functions. An operating system 604 controls the allocation and usage of the components of the electronic device 600 and supports one or more operations of the application (see, the applications 606) that implements one or more of the innovative features described herein. In addition, the applications 606 may include common mobile computing applications (e.g., telephony applications, email applications, calendars, contact managers, web browsers, messaging applications) or any other computing application.

The illustrated electronic device 600 includes one or more memory components, for example, a non-removable memory 608 and/or removable memory 610. The non-removable memory 608 and/or the removable memory 610 may be collectively known as a database in an embodiment. The non-removable memory 608 can include RAM, ROM, flash memory, a hard disk, or other well-known memory storage technologies. The removable memory 610 can include flash memory, smart cards, or a Subscriber Identity Module (SIM). The one or more memory components can be used for storing data and/or code for running the operating system 604 and the applications 606. The electronic device 600 may further include a user identity module (UIM) 612. The UIM 612 may be a memory device having a processor built in. The UIM 612 may include, for example, a subscriber identity module (SIM), a universal integrated circuit card (UICC), a universal subscriber identity module (USIM), a removable user identity module (R-UIM), or any other smart card. The UIM 612 typically stores information elements related to a mobile subscriber. The UIM 612 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 600 can support one or more input devices 620 and one or more output devices 630. Examples of the input devices 620 may include, but are not limited to, a touch screen/a display screen 622 (e.g., capable of capturing finger tap inputs, finger gesture inputs, multi-finger tap inputs, multi-finger gesture inputs, or keystroke inputs from a virtual keyboard or keypad), a microphone 624 (e.g., capable of capturing voice input), a camera module 626 (e.g., capable of capturing still picture images and/or video images) and a physical keyboard 628. Examples of the output devices 830 may include, but are not limited to, a speaker 632 and a display 634. Other possible output devices can include piezoelectric or other haptic output devices. Some devices can serve more than one input/output function. For example, the touch screen 622 and the display 634 can be combined into a single input/output device.

A wireless modem 640 can be coupled to one or more antennas (not shown in FIG. 6) and can support two-way communications between the processor 602 and external devices, as is well understood in the art. The wireless modem 640 is shown generically and can include, for example, a cellular modem 642 for communicating at long range with the mobile communication network, a Wi-Fi compatible modem 644 for communicating at short range with an external Bluetooth-equipped device or a local wireless data network or router, and/or a Bluetooth-compatible modem 646. The wireless modem 640 is typically configured for communication with one or more cellular networks, such as a GSM network for data and voice communications within a single cellular network, between cellular networks, or between the electronic device 600 and a public switched telephone network (PSTN).

The electronic device 600 can further include one or more input/output ports 650, a power supply 652, one or more sensors 654 for example, an accelerometer, a gyroscope, a compass, or an infrared proximity sensor for detecting the orientation or motion of the electronic device 600 and biometric sensors for scanning biometric identity of an authorized user, a transceiver 656 (for wirelessly transmitting analog or digital signals) and/or a physical connector 660, which can be a USB port, IEEE 1294 (FireWire) port, and/or RS-232 port. The illustrated components are not required or all-inclusive, as any of the components shown can be deleted and other components can be added.

The disclosed one or more operations of the application server 110 or the application server 600 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

Particularly, the application server 110 or the application server 600 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the present invention provide multiple advantages such as the systems and methods allow for a user to experience the joy of exploration while browsing and searching a specific kind of web pages (especially looking for erotic streams/videos) and reduce the loneliness of exploring alone, by presenting multiple virtual screen each rendering what web-page other users are browsing/recommending for the user to stroll like window-shopping and/or providing interaction with other avatar or the virtual screen.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

What is claimed is:

1. A computer-implemented method, comprising:
    receiving, by an application server, a request from a user device associated with a user of a plurality of users for accessing a plurality of virtual screens of an interactive browsing platform;
    rendering, by the application server, the plurality of virtual screens on the user device of the user in response to receipt of the request from the user, wherein each virtual screen of the plurality of virtual screens comprises at least one or more shared content fed by one or more sources; and
    executing, by the application server, one or more control inputs provided by the user using at least one virtual element associated with the user, wherein corresponding actions are performed in the interactive browsing platform rendering the one or more shared content in the plurality of virtual screens in response to executing the one or more control inputs provided using the at least one virtual element of the user.

2. The computer-implemented method as claimed in claim 1, further comprising:
    receiving, by the application server, the one or more shared content from the plurality of users via one or more file sharing techniques, wherein the one or more shared content comprises at least webpages, image files, video files, and live streams; and
    creating, by the application server, the plurality of virtual screens by including the one or more shared content in each of the plurality of virtual screens based, at least in part, on content rendering techniques.

3. The computer-implemented method as claimed in claim 1, further comprising:
    displaying, by the application server, a visual representation of the at least one virtual element and a profile information of the user proximate to the visual representation of the at least one virtual element in a virtual screen among the plurality of virtual screens being viewed by the user,
    wherein displaying the visual representation of the at least one virtual element and the profile information of the user allows other users among the plurality of users of the interactive browsing platform to access data related to the visual representation of the at least one virtual element and the profile information of the user when the other users view the virtual screen that is being viewed by the user.

4. The computer-implemented method as claimed in claim 3, further comprising:
    receiving, by the application server, an input related to selection of a stealth function in the interactive browsing platform from the user; and
    activating, by the application server, the stealth function in the interactive browsing platform for restricting access to at least the one or more shared content of the virtual screen being viewed by the user, the profile information of the user and the visual representation of the user for the other users of the plurality of users when viewing the virtual screen being viewed by the user.

5. The computer-implemented method as claimed in claim 3, further comprising:
    receiving, by the application server, a first interaction instruction from the user viewing the one or more shared content in the virtual screen rendered in the interactive browsing platform; and in response to the first interaction instruction, controlling, by the application server, the visual representation of the at least one virtual element of the user to interact with a visual representation of at least one virtual element of the other users among the plurality of users accessing the virtual screen being viewed by the user.

6. The computer-implemented method as claimed in claim 1, further comprising:
receiving, by the application server, a second interaction instruction from the user viewing the one or more shared content in the virtual screen rendered in the interactive browsing platform; and
controlling, by the application server, the visual representation of the at least one virtual element of the user to interact with the one or more shared content rendered in the virtual screen of the interactive browsing platform.

7. The computer-implemented method as claimed in claim 6, further comprising:
receiving, by the application server, an input data for accessing the one or more shared content in the plurality of virtual screens rendered in the interactive browsing platform, the input data corresponding to a number of tokens being provided by the user in the interactive browsing platform; and
in response to receipt of the input data, rendering, by the application server, at least one visual effect in the interactive browsing platform to the user while the user accesses the interactive browsing platform.

8. The computer-implemented method as claimed in claim 7, further comprising:
receiving, by the application server, a third interaction instruction from the user for customizing the visual representation of the at least one virtual element associated with at least the user and the other users of the virtual screen rendered in the interactive browsing platform,
wherein the third interaction instruction for customizing the visual representation of the at least one virtual element is transmitted by the user upon providing the input data in the interactive browsing platform; and
transmitting, by the application server, an invite to the other users of the interactive browsing platform in response to receipt of the third interaction instruction, wherein the visual representation of the at least one virtual element of the other users is customized upon acceptance of the invite by the other users.

9. The computer-implemented method as claimed in claim 1, further comprising
dynamically adjusting, by the application server, at least one attribute of the one or more shared content in the virtual screen based at least on monitoring at least one virtual screen parameter of the virtual screen,
wherein the at least one attribute comprises at least a position and dimensions of the virtual screen and the at least one virtual screen parameter comprises a number of users of the virtual screen, input data received from each of the plurality of users for the one or more shared content displayed in the virtual screen.

10. The computer-implemented method as claimed in claim 1, further comprising:
monitoring, by the application server, the actions performed in the interactive browsing platform rendering the one or more shared content in the plurality of virtual screens to the user;

creating, by the application server, a control instruction in response to determining the actions performed in the interactive browsing platform; and
transmitting, by the application server, the control instruction to the user associated with a sexual stimulation device communicably coupled to the user device, the control instruction configured to operate the sexual stimulation device for providing sexual stimulation to the user.

11. The computer-implemented method as claimed in claim 1, further comprising:
determining, by the application server, a category of the one or more shared content of the plurality of virtual screens to be rendered to the user based at least on one or more conditions defined in the interactive browsing platform, the one or more conditions comprising at least age factor, format of the one or more shared content rendered in the plurality of virtual screens, and a rating of the one or more shared content.

12. The computer-implemented method as claimed in claim 10, further comprising:
facilitating, by the application server, dynamic teleportation of a virtual representation of at least one virtual element of the user rendered in a virtual screen of the plurality of virtual screens to another virtual screen of the plurality of virtual screens based on real-time identification of the one or more conditions in the interactive browsing platform,
wherein the category of the one or more shared content of the other virtual screen rendered to the user is determined based at least on the one or more conditions.

13. An application server, comprising:
a communication interface;
a memory storing executable instructions; and
a processor operatively coupled with the communication interface and the memory, the processor configured to execute the executable instructions to cause the application server to at least:
receive a request from a user device associated with a user of a plurality of users for accessing a plurality of virtual screens of an interactive browsing platform,
render the plurality of virtual screens on the user device of the user in response to receipt of the request from the user, wherein each virtual screen of the plurality of virtual screens comprises one or more shared content fed by one or more sources, and
execute one or more control inputs provided by the user using at least one virtual element associated with the user, wherein corresponding actions are performed in the interactive browsing platform rendering the one or more shared content in the plurality of virtual screens in response to executing the one or more control inputs provided using the at least one virtual element of the user.

14. The application server as claimed in claim 13, wherein the application server is further caused to at least:
display a visual representation of the at least one virtual element and a profile information of the user proximate to the visual representation of the at least one virtual element in a virtual screen among the plurality of virtual screens being viewed by the user,
wherein displaying the visual representation of the at least one virtual element and the profile information of the user allows other users among the plurality of users of the interactive browsing platform to access data related to the visual representation of the at least one virtual element and the profile information of the user when the other users view the virtual screen that is being viewed by the user.

15. The application server as claimed in claim 14, wherein the application server is further caused to at least:
receive a first interaction instruction from the user viewing the one or more shared content in the virtual screen rendered in the interactive browsing platform; and
in response to the first interaction instruction, control the visual representation of the at least one virtual element of the user to interact with a visual representation of at least one virtual element of the other users among the plurality of users accessing the virtual screen being viewed by the user.

16. The application server as claimed in claim 13, wherein the application server is further caused to at least:
receive a second interaction instruction from the user viewing the one or more shared content in the virtual screen rendered in the interactive browsing platform; and
control the visual representation of the at least one virtual element of the user to interact with the one or more shared content rendered in the virtual screen of the interactive browsing platform.

17. The application server as claimed in claim 13, wherein the application server is further caused to at least:
receive a third interaction instruction from the user for customizing the visual representation of the at least one virtual element associated with at least the user and the other users of the virtual screen rendered in the interactive browsing platform, wherein the third interaction instruction for customizing the visual representation of the at least one virtual element is transmitted by the user upon providing the input data in the interactive browsing platform; and
transmit an invite to the other users of the interactive browsing platform in response to receipt of the third interaction instruction, wherein the visual representation of the at least one virtual element of the other users is customized upon acceptance of the invite by the other users.

18. The application server as claimed in claim 13, wherein the application server is further caused to at least:
monitor the actions performed in the interactive browsing platform rendering the one or more shared content in the plurality of virtual screens to the user;
create a control instruction in response to determining the actions performed in the interactive browsing platform; and
transmit the control instruction to the user associated with a sexual stimulation device communicably coupled to the user device, the control instruction configured to operate the sexual stimulation device for providing sexual stimulation to the user.

19. The application server as claimed in claim 13, wherein the application server is further caused to at least:
determine a category of the one or more shared content of the plurality of virtual screens to be rendered to the user based at least on one or more conditions defined in the interactive browsing platform, the one or more conditions comprising at least age factor, format of the one or more shared content rendered in the plurality of virtual screens, and a rating of the one or more shared content; and
facilitate dynamic teleportation of a virtual representation of at least one virtual element of the user rendered in a virtual screen of the plurality of virtual screens to another virtual screen of the plurality of virtual screens based on real-time identification of the one or more conditions in the interactive browsing platform, wherein the category of the one or more shared content of the other virtual screen rendered to the user is determined based at least on the one or more conditions.

20. A non-transitory computer-readable storage medium comprising computer-executable instructions that, when executed by at least a processor of an application server, cause the application server to perform a method comprising:
receiving a request from a user device associated with a user of a plurality of users for accessing a plurality of virtual screens of an interactive browsing platform;
rendering the plurality of virtual screens on the user device of the user in response to receipt of the request from the user, wherein each virtual screen of the plurality of virtual screens comprises at least one or more shared content fed by one or more sources; and
executing one or more control inputs provided by the user using at least one virtual element associated with the user, wherein corresponding actions are performed in the interactive browsing platform rendering the one or more shared content in the plurality of virtual screens in response to executing the one or more control inputs provided using the at least one virtual element of the user.

* * * * *